(12) United States Patent
Zhang et al.

(10) Patent No.: US 10,439,406 B2
(45) Date of Patent: Oct. 8, 2019

(54) TERMINAL AND METHOD FOR CHARGING THE SAME

(71) Applicant: GUANGDONG OPPO MOBILE TELECOMMUNICATIONS CORP., LTD., Dongguan (CN)

(72) Inventors: Qiang Zhang, Dongguan (CN); Fanhong Kong, Dongguan (CN); Fuchun Liao, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 78 days.

(21) Appl. No.: 15/802,190

(22) Filed: Nov. 2, 2017

(65) Prior Publication Data
US 2018/0205241 A1    Jul. 19, 2018

(30) Foreign Application Priority Data

Jan. 13, 2017 (CN) .......................... 2017 1 0026435

(51) Int. Cl.
*H02J 7/00* (2006.01)

(52) U.S. Cl.
CPC ............ *H02J 7/0021* (2013.01); *H02J 7/007* (2013.01); *H02J 7/0013* (2013.01)

(58) Field of Classification Search
CPC ......... H02J 7/0021; H02J 7/007; H02J 7/0013
(Continued)

(56) References Cited

U.S. PATENT DOCUMENTS 8,497,662 B2 * 7/2013 Aradachi .......... H01M 10/4221
320/106
2003/0160592 A1    8/2003 Murakami et al.
(Continued)

FOREIGN PATENT DOCUMENTS

CN      101841176 A    9/2010
CN      102185349 A    9/2011
(Continued)

OTHER PUBLICATIONS

European Patent Application No. 17198902.3, Extended Search and Opinion dated Jun. 7, 2018, 9 pages.
(Continued)

*Primary Examiner* — M Baye Diao
(74) *Attorney, Agent, or Firm* — Lathrop Gage LLP (57) ABSTRACT

The present disclosure provides a method and an apparatus for charging and a terminal. In the present disclosure, remaining electric quantities in the two batteries may be acquired. A trickle-current charging and a constant-current charging may be performed on a first battery of the two batteries in sequence when the remaining electric quantities in the two batteries are less than a preset value. It may be stopped to charge the first battery and the trickle-current charging and the constant-current charging may be performed on a second battery of the two batteries in sequence when a charging state of the first battery is changed from the constant-current charging to a constant-voltage charging. The constant-voltage charging may be performed on the two batteries simultaneously when the constant-current charging for the second battery finishes.

17 Claims, 6 Drawing Sheets

(58) Field of Classification Search
USPC .......................................................... 320/106
See application file for complete search history.

(56) References Cited

U.S. PATENT DOCUMENTS

| | | | |
|---|---|---|---|
| 2008/0007218 A1 | 1/2008 | Veselic | |
| 2011/0279094 A1* | 11/2011 | Nakatsuji | G01R 31/3828 320/162 |
| 2013/0110430 A1* | 5/2013 | Nishi | H01M 10/48 702/63 |
| 2013/0127687 A1* | 5/2013 | Yu | H01M 10/44 345/1.1 |

FOREIGN PATENT DOCUMENTS

| | | |
|---|---|---|
| CN | 103269098 A | 8/2013 |
| CN | 104901409 A | 9/2015 |
| CN | 205256032 U | 5/2016 |
| CN | 105743160 A | 7/2016 |
| CN | 106786962 A | 5/2017 |
| JP | 2001178005 A | 6/2001 |

OTHER PUBLICATIONS

PCT/CN2017/108504 English translation of International Search Report and Written Opinion dated Jan. 31, 2018, 14 pages.

* cited by examiner

TERMINAL AND METHOD FOR CHARGING THE SAME

CROSS REFERENCE TO RELATED APPLICATION

This application is based upon and claims priority and benefits of Chinese Patent Application No. 201710026435.7, filed with State Intellectual Property Office on Jan. 13, 2017, the entire content of which is incorporated herein by reference.

TECHNICAL FIELD

The present disclosure generally relates to a communication field, and more particularly, to a method and an apparatus for charging and a terminal.

BACKGROUND

With a popularization of mobile terminals such as smart phones, a user may use a mobile phone more frequently. Thus, a demand for battery capacity in the mobile phone increases. However, since the battery capacity in the mobile phone is limited by a space inside of the mobile phone, it is difficult to provide a satisfied endurance of the battery to the user. Therefore, a mobile phone with double-batteries has sprung up.

In general, when charging the mobile phone with double-batteries, after one of two batteries is full, the other one may start charging. A charging efficiency under this circumstance is relatively low.

SUMMARY

Embodiments of the present disclosure provide a method for charging a terminal including two batteries. The method includes: acquiring remaining electric quantities in the two batteries; performing a trickle-current charging and a constant-current charging on a first battery of the two batteries in sequence when the remaining electric quantities in the two batteries are less than a preset value; stopping charging the first battery and performing the trickle-current charging and the constant-current charging on a second battery of the two batteries in sequence when a charging state of the first battery is changed from the constant-current charging to a constant-voltage charging; and performing the constant-voltage charging on the two batteries simultaneously when the constant-current charging for the second battery finishes.

Embodiments of the present disclosure provide a terminal, including a processor, and a memory storing computer programs executable on the processor, in which the processor is configured to perform the computer programs to realize any one of the above-mentioned methods.

Embodiments of the present disclosure provide a non-transitory computer-readable storage medium having stored therein instructions that, when executed by a processor of a mobile terminal, causes the mobile terminal to perform any one of the above-mentioned methods.

DETAILED DESCRIPTION

With reference to accompanying drawings, the same or similar elements are denoted by like reference numerals throughout the descriptions. The principle of the present disclosure is illustrated by taking embodiments being implemented in a suitable computing environment as examples. The following description is based on the illustrated embodiments of the present disclosure, which shall not be construed to limit other embodiments of the present disclosure which are not described in detail herein.

In the following descriptions, detail embodiments of the present disclosure may be illustrated with reference to steps and numerals of operations executed by one or more computers, unless specified or limited otherwise. Thus, it will be appreciated that these steps and operations, which are referred to be executed by the computer several times, are manipulated by a computer processing unit which represents electronic signals representing data in a structured form. This manipulation may convert the data or maintain the data at a location in a memory system of the computer, so as to re-configure or change the operation of the computer in a known way for the skills in the art. A data structure maintained for the data is at a physical location in the memory, which has special property defined by the data structure. However, the principle of the present disclosure described above by the foregoing text is not to be construed as limiting, and the skills in the art will appreciated that various steps and operations described as follows may also be performed in hardware.

Figure 1:
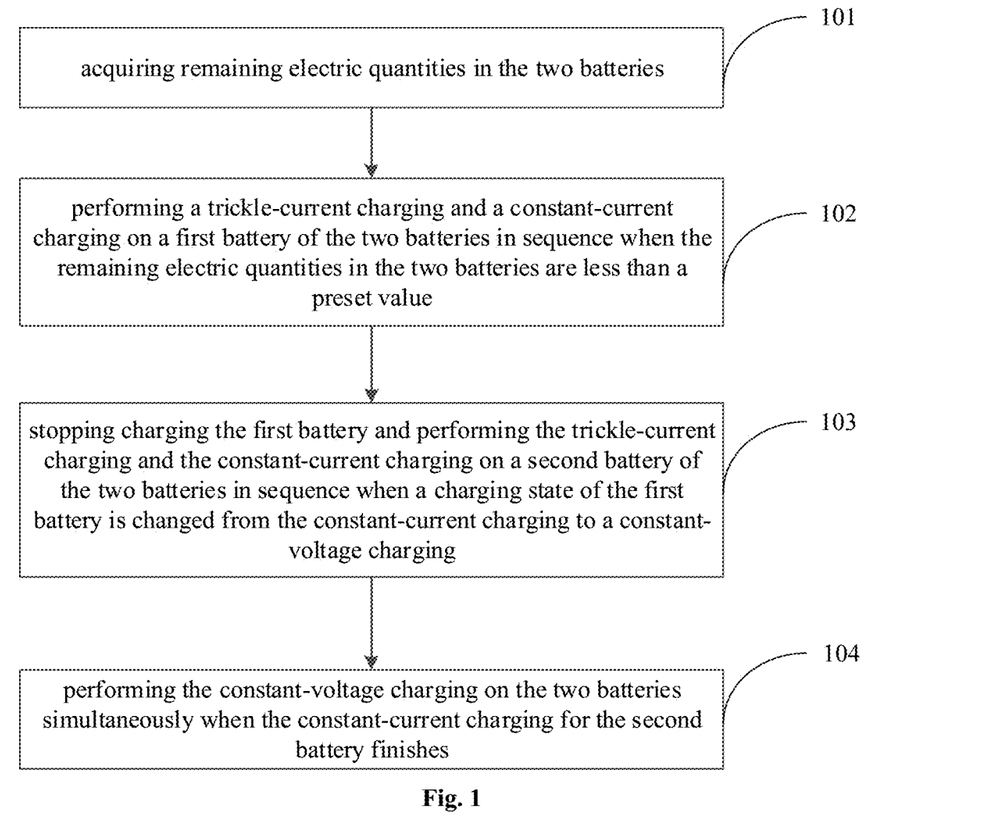
FIG. 1 is a flow chart of a method for charging according to an embodiment of the present disclosure.

The method and the apparatus for charging are mainly integrated in a terminal such as an IPAD and a mobile phone. The terminal includes two batteries. Referring to FIG. 1, the method for charging includes the following.

At block 101, remaining electric quantities in the two batteries are acquired.

Figure 2:
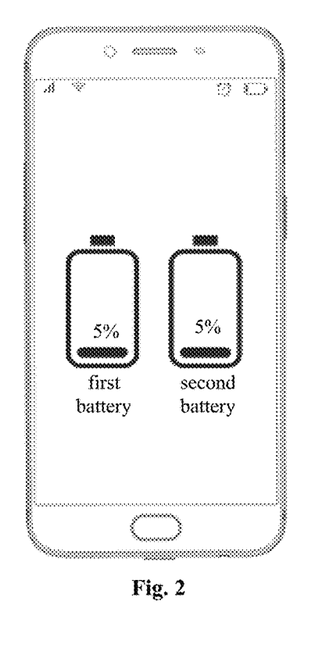
FIG. 2 is a schematic diagram illustrating a charging scene of a method for charging according to an embodiment of the present disclosure.

At this block, the remaining electric quantities in the two batteries may be computed by detecting voltages of cells in the two batteries. For example, as illustrated in FIG. 2, the remaining electric quantities are detected as 5% for both of the two batteries.

At block 102, a trickle-current charging and a constant-current charging are performed on a first battery of the two batteries in sequence when the remaining electric quantities in the two batteries are less than a preset value.

Figure 3:
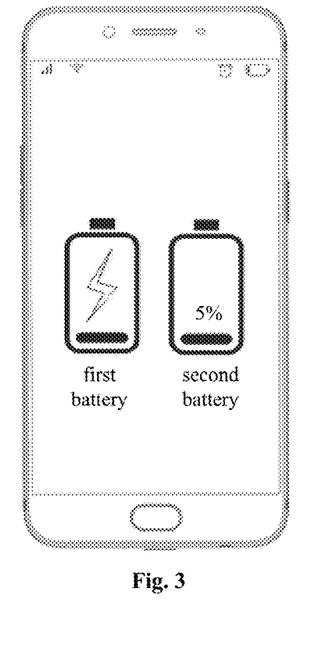
FIG. 3 is a schematic diagram illustrating a charging scene of a method for charging according to another embodiment of the present disclosure.

In a practical application, after a battery is used for a period of time, remaining electric quantity detected in the battery may be inaccurate. More particularly, after the battery ages, even though it is detected that the remaining electric quantity in the battery is high, the remaining electric quantity may be consumed in a short period of time such that the terminal may shut down. Therefore, the preset value should be set according to a current aging level of the battery. For example, the remaining electric quantity detected a preset period of time before the remaining electric quantity runs out last time may be considered as the preset value. As an example, the remaining electric quantity detected three minutes before the remaining electric quantity runs out may be set as the preset value. At this block, the first battery to be charged may be selected firstly according to the aging level, a battery capacity, a remaining electric quantity of the battery and the like, such that it may be ensured that the selected battery may finish the constant-current charging as soon as possible and then supply power to a mainboard of the terminal, and a current provided via an adapter may be used to charge the other battery, thereby shortening a charging period of time. As illustrated in FIG. 3, the first battery is selected to be charged.

At block 103, when a charging state of the first battery is changed from the constant-current charging to a constant-voltage charging, charging the first battery is stopped and the trickle-current charging and the constant-current charging are performed on a second battery of the two batteries in sequence.

Figure 4:
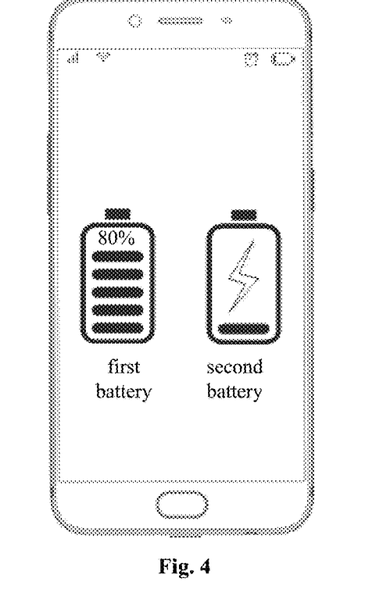
FIG. 4 is a schematic diagram illustrating a charging scene of a method for charging according to yet another embodiment of the present disclosure.

When charging the selected first battery, a charging state of the first battery may be detected simultaneously. The charging state may be monitored based on the current and the voltage of the first battery. For example, as illustrated in FIG. 4, when the first battery enters the constant-current charging, the remaining electric quantity of the first battery reaches 80%.

At block 104, the constant-voltage charging is performed on the two batteries simultaneously when the constant-current charging for the second battery finishes.

Figure 5:
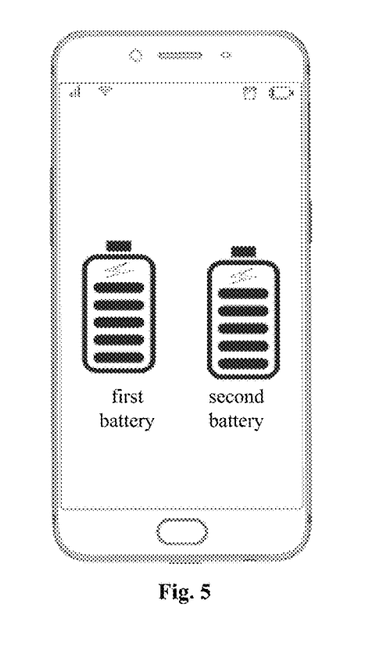
FIG. 5 is a schematic diagram illustrating a charging scene of a method for charging according to still another embodiment of the present disclosure.

When charging the second battery, a charging state of the second battery may be detected simultaneously. The charging state may be monitored similarly based on the current and the voltage of the second battery. For example, as illustrated in FIG. 5, the remaining electric quantities of the first battery and the second battery reach 80%, and the constant-voltage charging may be performed on the two batteries simultaneously.

Figure 6:
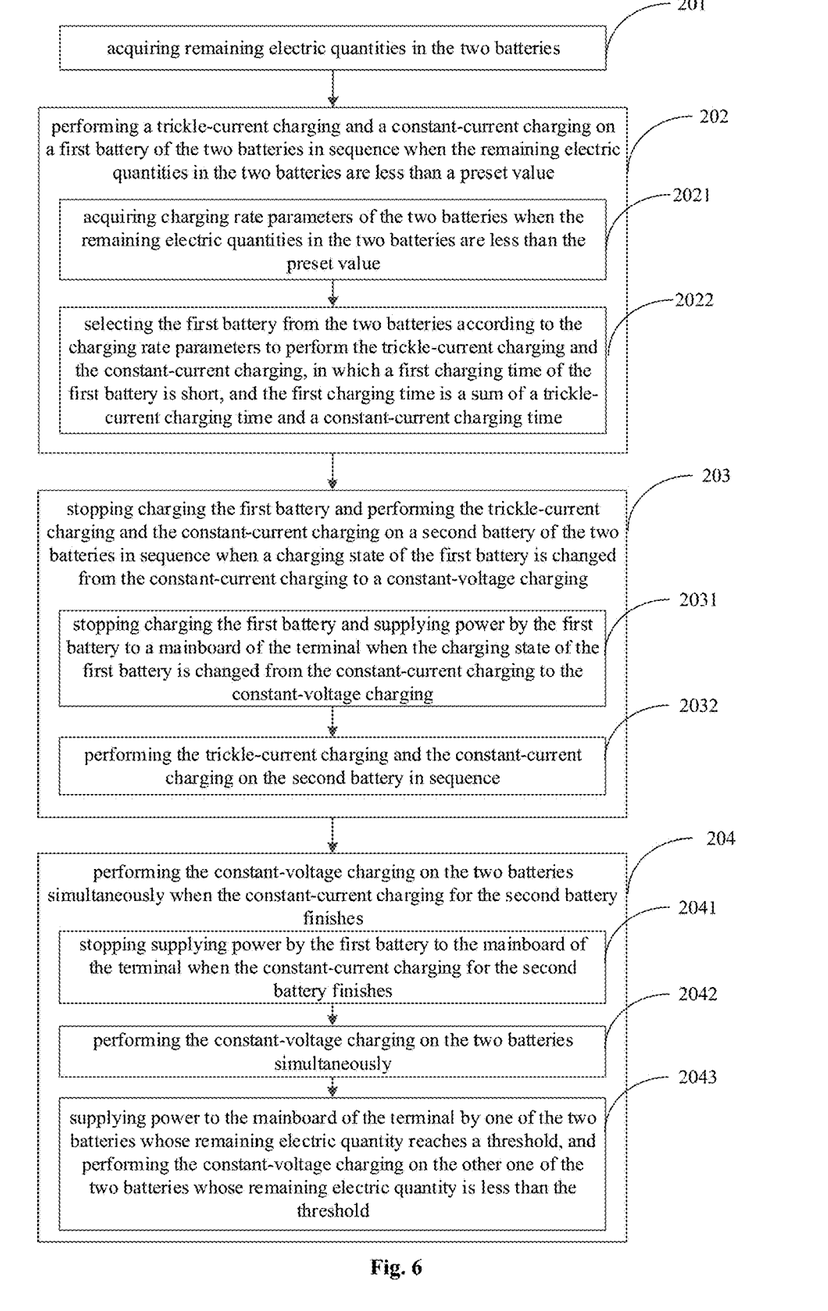
FIG. 6 is a flow chart of a method for charging according to another embodiment of the present disclosure.

Referring to FIG. 6, in other embodiments of the present disclosure, the method for charging includes the following.

At block 201, remaining electric quantities in the two batteries are acquired.

At this block, the remaining electric quantities in the two batteries may be computed by detecting voltages of cells in the two batteries. For example, as illustrated in FIG. 2, the remaining electric quantities are detected as 5% for both of the two batteries.

At block 202, a trickle-current charging and a constant-current charging are performed on a first battery of the two batteries in sequence when the remaining electric quantities in the two batteries are less than a preset value.

In a practical application, after a battery is used for a period of time, remaining electric quantity detected in the battery may be inaccurate. More particularly, after the battery ages, even though it is detected that the remaining electric quantity in the battery is high, the remaining electric quantity may be consumed in a short period of time such that the terminal may shut down. Therefore, the preset value should be set according to a current aging level of the battery. For example, remaining electric quantity detected a preset period of time before the remaining electric quantity runs out last time may be considered as the preset value. As an example, the remaining electric quantity detected three minutes before the remaining electric quantity runs out may be set as the preset value. At this block, the first battery to be charged may be selected firstly according to the aging level, a battery capacity, a remaining electric quantity of the battery and the like, such that it may be ensured that the selected battery may finish the constant-current charging as soon as possible and then supply power to a mainboard of the terminal, and a current provided via an adapter may be used to charge the other battery, thereby shortening a charging period of time. As illustrated in FIG. 3, the first battery is selected to be charged.

In some embodiments, block 202 may include the following.

At block 2021, charging rate parameters of the two batteries are acquired when the remaining electric quantities in the two batteries are less than the preset value. The charging rate parameter is related to a battery capacity and a resistance of the battery, which is configured to identify a speed from the trickle-current charging to the constant-current charging.

At block 2022, the first battery is selected from the two batteries according to the charging rate parameters to perform the trickle-current charging and the constant-current charging, in which a first charging time of the first battery is short, and the first charging time is a sum of a trickle-current charging time and a constant-current charging time. For each battery, the first charging time is a sum of a trickle-current charging time and a constant-current charging time for charging the battery last time.

At block 203, when a charging state of the first battery is changed from the constant-current charging to a constant-voltage charging, charging the first battery is stopped and the trickle-current charging and the constant-current charging are performed on a second battery of the two batteries in sequence.

When charging the selected first battery, a charging state of the first battery may be detected simultaneously. The charging state may be monitored based on the current and the voltage of the first battery. For example, as illustrated in FIG. 4, when the first battery enters the constant-current charging, the remaining electric quantity of the first battery reaches 80%.

In some embodiments, block 203 may include the following.

At block 2031, charging the first battery is stopped and the first battery supplies power to a mainboard of the terminal when the charging state of the first battery is changed from the constant-current charging to the constant-voltage charging.

At block 2032, the trickle-current charging and the constant-current charging are performed on the second battery in sequence.

When the first battery finishes the constant-current charging quickly, the first battery supplies power to the mainboard of the terminal, such that the current input via an adapter is used to charge the second battery, and the second battery may enter and finish the constant-current charging quickly, thereby improving a charging efficiency.

At block 204, the constant-voltage charging is performed on the two batteries simultaneously when the constant-current charging for the second battery finishes.

When charging the second battery, a charging state of the second battery may be detected simultaneously. The charging state may be monitored similarly based on the current and the voltage of the second battery. For example, as illustrated in FIG. 5, the remaining electric quantities of the first battery and the second battery reach 80%, and the constant-voltage charging may be performed on the two batteries simultaneously.

In some embodiments, block 204 may include the following.

At block 2041, when the constant-current charging for the second battery finishes, the first battery stop supplying power to the mainboard of the terminal.

At block 2042, the constant-voltage charging is performed on the two batteries simultaneously.

When the second battery finishes the constant-current charging, it is unnecessary to charge in a heavy current. Therefore, the current input via the adapter may be used to supply power to the mainboard, and the constant-voltage charging is performed on the two batteries simultaneously.

At block 2043, one of the two batteries whose remaining electric quantity reaches a threshold supplies power to the mainboard of the terminal, and the constant-voltage charging is performed on the other one of the two batteries whose remaining electric quantity is less than the threshold.

When one of the two batteries is charged to be full or to make the remaining electric quantity reach a threshold, this battery may supply power to the mainboard of the terminal, and the adapter is prevented from applying directly power to the mainboard, thereby protecting the mainboard.

Therefore, in embodiments of the present disclosure, remaining electric quantities in the two batteries may be acquired. A trickle-current charging and a constant-current charging may be performed on a first battery of the two batteries in sequence when the remaining electric quantities in the two batteries are less than a preset value. It may be stopped to charge the first battery and the trickle-current charging and the constant-current charging may be performed on a second battery of the two batteries in sequence when a charging state of the first battery is changed from the constant-current charging to a constant-voltage charging. The constant-voltage charging may be performed on the two batteries simultaneously when the constant-current charging for the second battery finishes. Therefore, a quick charge for a terminal including two batteries may be realized. By allocating a charging current, a total charging quantity in a same period of time may be maximum, thereby improving a charging efficiency.

Figure 7:
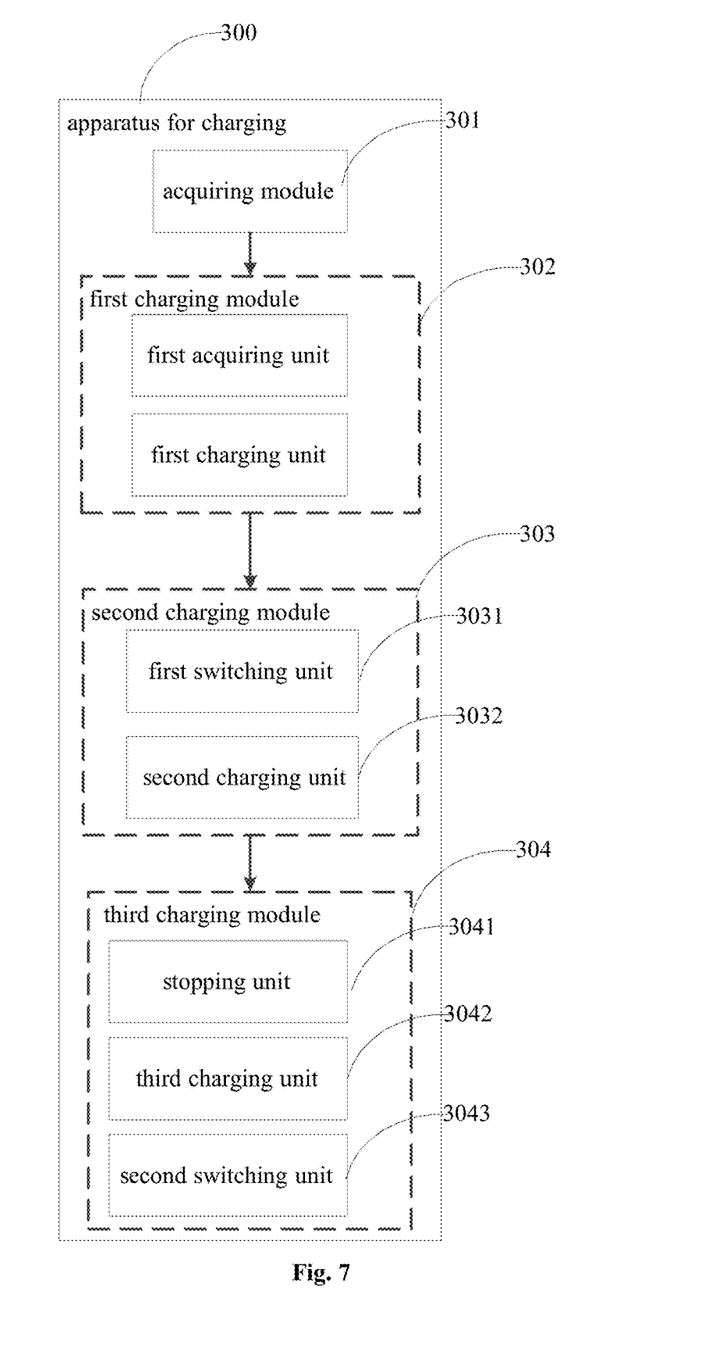
FIG. 7 is block diagram of an apparatus for charging according to an embodiment of the present disclosure.

As illustrated in FIG. 7, embodiments of the present disclosure also provide an apparatus for charging a terminal including two batteries. The apparatus includes an acquiring module 301, a first charging module 302, a second charging module 303, and a third charging module 304.

The acquiring module 301 is configured to acquire remaining electric quantities in the two batteries.

The first charging module 302 is configured to perform a trickle-current charging and a constant-current charging on a first battery of the two batteries in sequence when the remaining electric quantities in the two batteries are less than a preset value.

The first charging module 302 includes a first acquiring unit 3021 and a first charging unit 3022.

The first acquiring unit 3021 is configured to acquire charging rate parameters of the two batteries when the remaining electric quantities in the two batteries are less than the preset value. The first charging unit 3022 is configured to select the first battery from the two batteries according to the charging rate parameters to perform the trickle-current charging and the constant-current charging, in which a first charging time of the first battery is short, and the first charging time is a sum of a trickle-current charging time and a constant-current charging time.

The second charging module 303 is configured to stop charging the first battery and to perform the trickle-current charging and the constant-current charging on a second battery of the two batteries in sequence when a charging state of the first battery is changed from the constant-current charging to a constant-voltage charging.

The second charging module 303 includes a first switching unit 3031 and a second charging unit 3032.

The first switching unit 3031 is configured to stop charging the first battery and to supply power by the first battery to a mainboard of the terminal when the charging state of the first battery is changed from the constant-current charging to the constant-voltage charging.

The second charging unit 3032 is configured to perform the trickle-current charging and the constant-current charging on the second battery in sequence.

The third charging module 304 is configured to perform the constant-voltage charging on the two batteries simultaneously when the constant-current charging for the second battery finishes.

The third charging module 304 includes a stopping unit 3041, a third charging unit 3042 and a second switching unit 3043.

The stopping unit 3041 is configured to stop supplying power by the first battery to the mainboard of the terminal when the constant-current charging for the second battery finishes.

The third charging unit 3042 is configured to perform the constant-voltage charging on the two batteries simultaneously.

The second switching unit 3043 is configured to supply power to the mainboard of the terminal by one of the two batteries whose remaining electric quantity reaches a threshold, and to perform the constant-voltage charging on the other one of the two batteries whose remaining electric quantity is less than the threshold.

Embodiments of the devices correspond to embodiments of the methods. For a related content, reference is made to partial descriptions of the embodiments of the methods. The above embodiments of the devices are exemplary. Units described as separate components may be or may not be physically separated. Components shown as units may be or may not be physical units, in other words, may be integrated on one position or distributed to a plurality of network units. Some or all of the modules may be selected to achieve the objective of the solution of the embodiments according to actual requirements. Those skilled in the art may understand and implement the present disclosure without making creative efforts.

Figure 8:
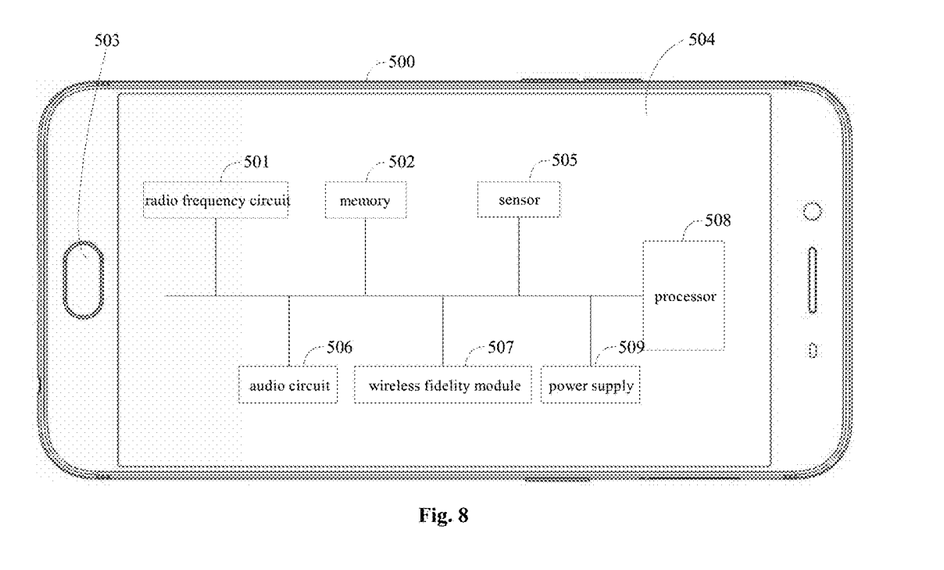
FIG. 8 is a block diagram of a terminal according to an embodiment of the present disclosure.

Embodiments of the present disclosure also provide a terminal. The terminal may include a mobile terminal such as a mobile phone, a tablet or a personal digital assistant (PDA) and the like. Referring to FIG. 8, FIG. 8 is a block diagram of a terminal according to an embodiment of the present disclosure. The terminal 500 may include a radio frequency (RF) circuit 501, a memory 502 including one or more computer readable memory mediums, an input unit 503, a display unit 504, a sensor 505, an audio circuit 506, a Wi-Fi (wireless fidelity) module 507, a processor 508 including one or more processing cores, a power supply 509 or other components. The skills in the art may understand that the structure of the terminal illustrated in FIG. 8 does not constitute a limitation on the terminal, and the terminal may include more or less components than illustrated or combinations of some components or different component arrangements.

The radio frequency circuit 501 may be configured to receive and send signals during an information receiving and sending process or a call process. Particularly, the radio frequency circuit receives downlink information from a base station, then delivers the downlink information to the processor 508 for processing, and sends uplink data of the mobile phone to the base station. Generally, the radio frequency circuit 501 includes, but is not limited to, an antenna, at least one amplifier, a tuner, one or more oscillators, a subscriber identity module (SIM), a transceiver, a coupler, a low noise amplifier (LNA), and a duplexer and the like. In addition, the radio frequency circuit 501 may also communicate with a network and another device by wireless communication. The wireless communication may use any communication standard or protocol, which includes, but is not limited to, global system for mobile communications (GSM), general packet radio service (GPRS), code division multiple access (CDMA), wideband code division multiple access (WCDMA), long term evolution (LTE), e-mail, short messaging service (SMS), and the like.

The memory 502 may be configured to store application programs and data. The application programs stored in the memory 502 may include executable codes. The application programs may consist of various functional modules. The processor 508 runs the application programs stored in the memory 502, to implement various functional applications and data processing. The memory 502 may mainly include a program storage area and a data storage area. The program storage area may store an operating system, an application program required by at least one function (such as a sound playback function and an image display function), and the like. The data storage area may store data (such as audio data and an address book, etc.) created according to use of the mobile terminal, and the like. In addition, the memory 502 may include a high speed random access memory, and may also include a non-volatile memory such as at least one magnetic disk storage device, a flash memory, or another volatile solid-state storage device. Accordingly, the memory 502 also includes a memory controller, and provides accesses for the processor 508 and the input unit 503 to the memory 502.

The input unit 503 may be configured to receive input digit or character information or user character information (such as a fingerprint), and to generate a keyboard, a mouse, a joystick, an optical or trackball signal input related to the user setting and function control. Specifically, in a detail embodiment, the input unit 503 may include a touch-sensitive panel and another input device. The touch-sensitive panel, which may also be referred to as a touch screen, may collect a touch operation of a user on or near the touch-sensitive panel (such as an operation of a user on or near the touch-sensitive panel by using any suitable object or accessory, such as a finger or a stylus), and drive a corresponding connection apparatus according to a preset program. Optionally, the touch-sensitive panel may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 508. Moreover, the touch controller can receive and execute a command sent from the processor 508. In addition, the touch-sensitive panel may be may be a resistive, capacitive, infrared, or surface sound wave type touch-sensitive panel. In addition to the touch-sensitive panel, the input unit 503 may further include other input devices. Specifically, the input devices may include, but is not limited to, one or more of a physical keyboard, a functional key (such as a volume control key or a switch key), a fingerprint recognition assembly, a track ball, a mouse, and a joystick.

The display unit 504 may be configured to display information input by the user or information provided for the user, and various graphic user interfaces of the mobile terminal, in which the graphic user interface may be consist of a graph, a text, an icon, a video and any combination thereof. The display unit 504 may include a display panel. Optionally, the display panel may be configured by using a liquid crystal display (LCD), an organic light-emitting diode (OLED), or the like. Further, the touch-sensitive panel may cover the display panel. After detecting a touch operation on or near the touch-sensitive panel, the touch-sensitive panel transfers the touch operation to the processor 508 to determine the type of the touch operation, and the processor 508 then provides a corresponding visual output on the display panel based on the determined type. Although the touch-sensitive surface and the display panel are implemented as two separate components in FIG. 8 for inputting and the outputting, in some embodiments the touch-sensitive surface can be integrated with the display panel to achieve input and output functions.

The mobile terminal may further include at least one sensor 505, such as an optical sensor, a motion sensor, and other sensors. Specifically, the optical sensor may include an ambient light sensor and a proximity sensor. The ambient light sensor can adjust luminance of the display panel according to brightness of the ambient light. The proximity sensor may switch off the display panel and/or backlight when the mobile phone is moved to the ear. As one type of motion sensor, an acceleration sensor may be enumerated. The acceleration sensor can detect magnitude of accelerations in various directions (generally on three axes), may detect magnitude and a direction of the gravity when static, and may be applied to an application that recognizes a gesture of the mobile phone (for example, switching between landscape orientation and portrait orientation, a related game, and magnetometer gesture calibration), a function related to vibration recognition (such as a pedometer and a knock), and the like. The mobile terminal may include other sensors, such as a gyroscope, a barometer, a hygrometer, a thermometer, and an infrared sensor, which are not further described herein.

The audio circuit 506 may provide audio interfaces between the user and the mobile phone via a loudspeaker and a microphone. The audio circuit 506 may convert received audio data into an electric signal and transmit the electric signal to the loudspeaker. The loudspeaker converts the electric signal into a sound signal for output. On the other hand, the microphone converts a collected sound signal into an electric signal. The audio circuit 506 receives the electric signal and converts the electric signal into audio data, and outputs the audio data to the processor 508 for processing. Then, the processor 508 sends the audio data to, for example, another terminal device by using the radio frequency circuit 501, or outputs the audio data to the memory 502 for further processing. The audio circuit 506 may also include a headset jack to provide a communication between a headset and the mobile terminal.

Wi-Fi is a short distance wireless transmission technology. The mobile terminal may help, by using the Wi-Fi module 507, the user to receive and send e-mails, browse a webpage, access streaming media, and so on, which provides wireless broadband Internet access for the user. Although the Wi-Fi module 507 is illustrated in FIG. 8, it could be understood that the Wi-Fi module 507 is not an essential component of the mobile terminal, and when required, the Wi-Fi module 507 may be omitted as long as the scope of the essence of the present disclosure is not changed.

The processor 508 is the control center of the mobile terminal, and is coupled with various parts of the mobile phone by using various interfaces and lines. By running or executing the application programs stored in the memory 502, and invoking data stored in the memory, the processor 508 performs various functions and data processing of the mobile terminal, thereby performing overall monitoring on the mobile terminal. Optionally, the processor 508 may include one or more processing cores. Preferably, the processor 508 may integrate an application processor and a modem. The application processor mainly processes an operating system, a user interface, an application program, and the like. The modem mainly processes wireless communication. It may be understood that the foregoing modem may also not be integrated into the processor 508.

The mobile phone further includes the power supply 509 (such as a battery) for supplying power to the components. Preferably, the power supply 509 may be logically coupled with the processor 508 by using a power management system, thereby implementing functions such as charging, discharging and power consumption management by using the power management system. The power supply 509 may also include one or more a direct-current power or an alternating-current power, a rechargeable system, a power fault detecting circuit, a power converter or an inverter, power state indicator and other components.

Although not illustrated in FIG. 8, the mobile terminal may further include a camera, a Bluetooth module, and the like, which is not further described herein.

In embodiments of the present disclosure, the processor 508 in the mobile terminal may load one or more executable codes corresponding to a progress of the application program described above to the memory 502, and run the application program stored in the memory 502, so as to realize various functions of the method and the apparatus for charging in above embodiments: acquiring remaining electric quantities in the two batteries; performing a trickle-current charging and a constant-current charging on a first battery of the two batteries in sequence when the remaining electric quantities in the two batteries are less than a preset value; stopping charging the first battery and performing the trickle-current charging and the constant-current charging on a second battery of the two batteries in sequence when a charging state of the first battery is changed from the constant-current charging to a constant-voltage charging; and performing the constant-voltage charging on the two batteries simultaneously when the constant-current charging for the second battery finishes.

In the above embodiments, the descriptions focus on different aspects, a part which is not described in detail in a certain embodiment may refer to the detail descriptions of the method for charging, which will not be described herein.

Various operations of embodiments of the present disclosure are provided. In an embodiment, one or more operations may consist of computer readable instructions stored in one or more computer readable mediums, when executed by an electronic device, a computing device is configured to perform the operations. An order for describing some or all of the operations should not be related to an order of the operations. The skills in the art may understand that it is an alternative order for an advantageous implementation of the present disclosure. In addition, it should be understood that it is not necessary for all operations exist in each embodiment provided herein.

Furthermore, the wording "preferred" used in the description refers to an embodiment, an example or an illustration. Any "preferred" aspect or design should not be interpreted as better than other aspects or designs. Instead, a use of the wording "preferred" aims at presenting concepts in a detailed way. Similarly, the wording "or" used in the description refers to an including "or" rather than an excluding "or". In other words, unless there is a clear appoint or description, "X uses A or B" means any one of natural arrangements, i.e., when X uses A, X uses B or X uses A and B, "X uses A or B" is satisfied in any embodiments above.

Furthermore, although the present disclosure has been described with reference to one or more implementations, it will be appreciated by those skilled in the art that the disclosure includes equivalent modifications and changes that occur to those skilled in the art by reading and understanding the description and drawings. The present disclosure includes all the modifications and changes and is defined by impending claims. Specifically, regarding to various functions executed by above components (such as elements and resources, etc.), if it is not contrarily defined, terms for describing these components corresponds to any component for performing a certain function of the components (for example, they are equivalent in terms of the function), even though it is not equivalent to a disclosed structure of the functions in example embodiments of the present disclosure. In addition, although a certain feature of the present disclosure is disclosed relative to only one of several implementations, this feature may be combined to a desired or advantageous implementation regarding to a given or a certain application. Furthermore, regarding to the wording "comprise", "have", "contain" or the modifications thereof used in a detailed description or claims, these terms are similar to the wording "include".

Each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium. The computer readable storage medium may be, but is not limited to, read-only memories, magnetic disks, or optical disks. The above devices or systems may execute methods in corresponding method embodiments.

In conclusion, the forgoing description is only directed to preferred embodiments of the present disclosure, but not used to limit the present disclosure. All modifications, equivalents, variants and improvements made within the spirit and principle of the present disclosure shall fall within the protection scope of the present disclosure. Thus, the protection scope of the present disclosure shall be limited by the protection scope of the claims.

What is claimed is:

1. A method for charging a terminal comprising two batteries, comprising:
   acquiring remaining electric quantities in the two batteries;
   performing a trickle-current charging and a constant-current charging on a first battery of the two batteries in sequence when the remaining electric quantities in the two batteries are less than a preset value;

stopping charging the first battery and performing the trickle-current charging and the constant-current charging on a second battery of the two batteries in sequence when a charging state of the first battery is changed from the constant-current charging to a constant-voltage charging; and performing the constant-voltage charging on the two batteries simultaneously when the constant-current charging for the second battery finishes, wherein performing a trickle-current charging and a constant-current charging on a first battery of the two batteries in sequence when the remaining electric quantities in the two batteries are less than a preset value comprises:

acquiring charging rate parameters of the two batteries when the remaining electric quantities in the two batteries are less than the preset value; and selecting the first battery from the two batteries according to the charging rate parameters to perform the trickle-current charging and the constant-current charging, wherein a first charging time of the first battery is short, and the first charging time is a sum of a trickle-current charging time and a constant-current charging time.

2. The method according to claim 1, wherein stopping charging the first battery and performing the trickle-current charging and the constant-current charging on a second battery of the two batteries in sequence when a charging state of the first battery is changed from the constant-current charging to a constant-voltage charging comprises:

stopping charging the first battery and supplying power by the first battery to a mainboard of the terminal when the charging state of the first battery is changed from the constant-current charging to the constant-voltage charging; and performing the trickle-current charging and the constant-current charging on the second battery in sequence.

3. The method according to claim 1, wherein performing the constant-voltage charging on the two batteries simultaneously when the constant-current charging for the second battery finishes comprises:

stopping supplying power by the first battery to a mainboard of the terminal when the constant-current charging for the second battery finishes; and performing the constant-voltage charging on the two batteries simultaneously.

4. The method according to claim 3, wherein after the constant-voltage charging is performed simultaneously on the two batteries, the method further comprises:

supplying power to the mainboard of the terminal by one of the two batteries whose remaining electric quantity reaches a threshold, and performing the constant-voltage charging on the other one of the two batteries whose remaining electric quantity is less than the threshold.

5. The method according to claim 1, wherein acquiring remaining electric quantities in the two batteries, comprises:

acquiring a voltage across a cell of each of the two batteries as the corresponding remaining electric quantity.

6. The method according to claim 1, wherein the preset value is set according to a current aging level of the two batteries.

7. The method according to claim 1, wherein a remaining electric quantity detected during a preset period of time before the remaining electric quantity runs out last time is set as the preset value.

8. The method according to claim 1, wherein the charging rate parameter comprises at least one of an aging level, a battery capacity, and the remaining electric quantity of the battery.

9. A terminal, comprising a processor, and a memory storing computer programs executable on the processor, wherein the processor is configured to perform the computer programs to realize a method for charging a terminal comprising two batteries, and the method comprises:

acquiring remaining electric quantities in the two batteries;

performing a trickle-current charging and a constant-current charging on a first battery of the two batteries in sequence when the remaining electric quantities in the two batteries are less than a preset value;

stopping charging the first battery and performing the trickle-current charging and the constant-current charging on a second battery of the two batteries in sequence when a charging state of the first battery is changed from the constant-current charging to a constant-voltage charging; and performing the constant-voltage charging on the two batteries simultaneously when the constant-current charging for the second battery finishes, wherein the processor is configured to perform a trickle-current charging and a constant-current charging on a first battery of the two batteries in sequence when the remaining electric quantities in the two batteries are less than a preset value by acts of:

acquiring charging rate parameters of the two batteries when the remaining electric quantities in the two batteries are less than the preset value; and selecting the first battery from the two batteries according to the charging rate parameters to perform the trickle-current charging and the constant-current charging, wherein a first charging time of the first battery is short, and the first charging time is a sum of a trickle-current charging time and a constant-current charging time.

10. The terminal according to claim 9, wherein the processor is configured to stop charging the first battery and to perform the trickle-current charging and the constant-current charging on a second battery of the two batteries in sequence when a charging state of the first battery is changed from the constant-current charging to a constant-voltage charging by acts of:

stopping charging the first battery and supplying power by the first battery to a mainboard of the terminal when the charging state of the first battery is changed from the constant-current charging to the constant-voltage charging; and performing the trickle-current charging and the constant-current charging on the second battery in sequence.

11. The terminal according to claim 9, wherein the processor is configured to perform the constant-voltage charging on the two batteries simultaneously when the constant-current charging for the second battery finishes by acts of:

stopping supplying power by the first battery to a mainboard of the terminal when the constant-current charging for the second battery finishes; and performing the constant-voltage charging on the two batteries simultaneously.

12. The terminal according to claim 11, wherein after the constant-voltage charging is performed simultaneously on the two batteries, the processor is further configured to perform acts of:

supplying power to the mainboard of the terminal by one of the two batteries whose remaining electric quantity reaches a threshold, and performing the constant-voltage charging on the other one of the two batteries whose remaining electric quantity is less than the threshold.

13. The terminal according to claim 9, wherein the processor is configured to acquire remaining electric quantities in the two batteries by an act of:
   acquiring a voltage across a cell of each of the two batteries as the corresponding remaining electric quantity.

14. The terminal according to claim 9, wherein the preset value is set according to a current aging level of the two batteries.

15. The terminal according to claim 14, wherein the remaining electric quantity detected during a preset period of time before the remaining electric quantity runs out last time is set as the preset value.

16. The terminal according to claim 9, wherein the charging rate parameter comprises at least one of an aging level, a battery capacity, and the remaining electric quantity of the battery.

17. A non-transitory computer-readable storage medium having stored therein instructions that, when executed by a processor of a mobile terminal, causes the mobile terminal to perform a method for charging a terminal comprising two batteries, the charging method comprising:
   acquiring remaining electric quantities in the two batteries;
   performing a trickle-current charging and a constant-current charging on a first battery of the two batteries in sequence when the remaining electric quantities in the two batteries are less than a preset value;
   stopping charging the first battery and performing the trickle-current charging and the constant-current charging on a second battery of the two batteries in sequence when a charging state of the first battery is changed from the constant-current charging to a constant-voltage charging; and
   performing the constant-voltage charging on the two batteries simultaneously when the constant-current charging for the second battery finishes,
   wherein performing a trickle-current charging and a constant-current charging on a first battery of the two batteries in sequence when the remaining electric quantities in the two batteries are less than a preset value comprises:
   acquiring charging rate parameters of the two batteries when the remaining electric quantities in the two batteries are less than the preset value; and
   selecting the first battery from the two batteries according to the charging rate parameters to perform the trickle-current charging and the constant-current charging, wherein a first charging time of the first battery is short, and the first charging time is a sum of a trickle-current charging time and a constant-current charging time.

* * * * *